US012187560B2

(12) United States Patent
Tachibana et al.

(10) Patent No.: US 12,187,560 B2
(45) Date of Patent: Jan. 7, 2025

(54) DRIVING FORCE TRANSMISSION DEVICE AND IMAGE FORMING APPARATUS

(71) Applicant: FUJIFILM Business Innovation Corp., Tokyo (JP)

(72) Inventors: Kohei Tachibana, Kanagawa (JP); Yuya Shiokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 487 days.

(21) Appl. No.: 17/403,854

(22) Filed: Aug. 16, 2021

(65) Prior Publication Data

US 2022/0305811 A1 Sep. 29, 2022

(30) Foreign Application Priority Data

Mar. 24, 2021 (JP) ................................ 2021-050785

(51) Int. Cl.
*B65H 1/14* (2006.01)
*B41J 29/38* (2006.01)
*B65H 1/04* (2006.01)

(52) U.S. Cl.
CPC ................ *B65H 1/04* (2013.01); *B41J 29/38* (2013.01); *B65H 1/14* (2013.01)

(58) Field of Classification Search
CPC .................................. B41J 29/38; B65H 1/14
See application file for complete search history.

(56) References Cited

U.S. PATENT DOCUMENTS

| | | | | |
|---|---|---|---|---|
| 4,319,495 A * | 3/1982 | Salicini | B65B 65/02 74/813 L |
| 9,541,884 B1 | 1/2017 | Kawai | |
| 11,480,237 B2 * | 10/2022 | Tachibana | F16H 29/12 |

FOREIGN PATENT DOCUMENTS

| | | |
|---|---|---|
| JP | 2008164151 | 7/2008 |
| JP | 2017048922 | 3/2017 |
| JP | 2019207579 | 12/2019 |

OTHER PUBLICATIONS

"Office Action of Japan Counterpart Application", issued on Sep. 24, 2024, with English translation thereof, pp. 1-6.

* cited by examiner

*Primary Examiner* — Howard J Sanders
(74) *Attorney, Agent, or Firm* — JCIPRNET

(57) ABSTRACT

A driving force transmission device includes a rotating body that is rotated by receiving a driving force, a control unit that controls rotation of the other rotating part by being switched between a connection state where the control unit is connected to the other rotating part and a separation state where the control unit is separated from the other rotating part as states of the control unit with respect to the other rotating part, and an operation unit that is operated by receiving a force output from the rotating body and includes a contact mechanism to be in contact with the control unit, the contact mechanism being moved by the force output from the rotating body to operate the control unit and the contact mechanism then being separated from the control unit.

19 Claims, 9 Drawing Sheets

DRIVING FORCE TRANSMISSION DEVICE AND IMAGE FORMING APPARATUS

CROSS-REFERENCE TO RELATED APPLICATIONS

This application is based on and claims priority under 35 USC 119 from Japanese Patent Application No. 2021-050785 filed Mar. 24, 2021.

BACKGROUND

(i) Technical Field

The present invention relates to a driving force transmission device and an image forming apparatus.

(ii) Related Art

JP2017-48922A discloses a device including: a shaft; an input gear that is rotatably supported by the shaft; an output gear that is rotatably supported by the shaft; and a connection member that is biased in an axial direction and is movably supported, is rotated in a state where the connection member is connected to the input gear, and is switched to any one of a state where the connection member is connected to the output gear or a state where the connection between the connection member and the output gear is released.

JP2008-164151A discloses configuration where an intermittent driving device includes a toothless gear that includes a toothless portion where some teeth are absent, a drive gear that drives the toothless gear, and a release unit that releases the drive gear in a rotation direction in a case where the drive gear meshes with the toothless gear.

JP2019-207579A discloses a handle locking mechanism including a locking part that acquires a first position and a second position, takes the first position to prevent a second handle operation in a case where the insertion of a coin is not detected by a coin detection mechanism, and takes the second position to allow the second handle operation in a case where the insertion of a coin is detected by a coin detection mechanism.

SUMMARY

In a driving force transmission device transmitting a driving force, an operation unit may be operated to switch the state of the transmission of a driving force to another state.

In a case where the operation unit is adapted to be operated by only a spring in this driving force transmission device, the uncertainty of the switching of the transmission state of a driving force, such as the non-operation of the operation unit or the stop of the operation unit on the way, is increased.

Aspects of non-limiting embodiments of the present disclosure relate to a driving force transmission device and an image forming apparatus that increase the certainty of the switching of the transmission state of a driving force as compared to a case where an operation unit is adapted to be operated by only a spring.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a driving force transmission device including a rotating body that is rotated by receiving a driving force, a control unit that controls rotation of the other rotating part by being switched between a connection state where the control unit is connected to the other rotating part and a separation state where the control unit is separated from the other rotating part as states of the control unit with respect to the other rotating part, and an operation unit that is operated by receiving a force output from the rotating body and includes a contact mechanism to be in contact with the control unit, the contact mechanism being moved by the force output from the rotating body to operate the control unit and the contact mechanism then being separated from the control unit.

BRIEF DESCRIPTION OF THE DRAWINGS

Exemplary embodiment(s) of the present invention will be described in detail based on the following figures, wherein:

FIG. 5 is a diagram illustrating the movement of a slide member and the like;

FIG. 7 is a diagram showing another state of the operation unit and the like;

DETAILED DESCRIPTION

An exemplary embodiment of the present invention will be described below with reference to the accompanying drawings.

Figure 1:
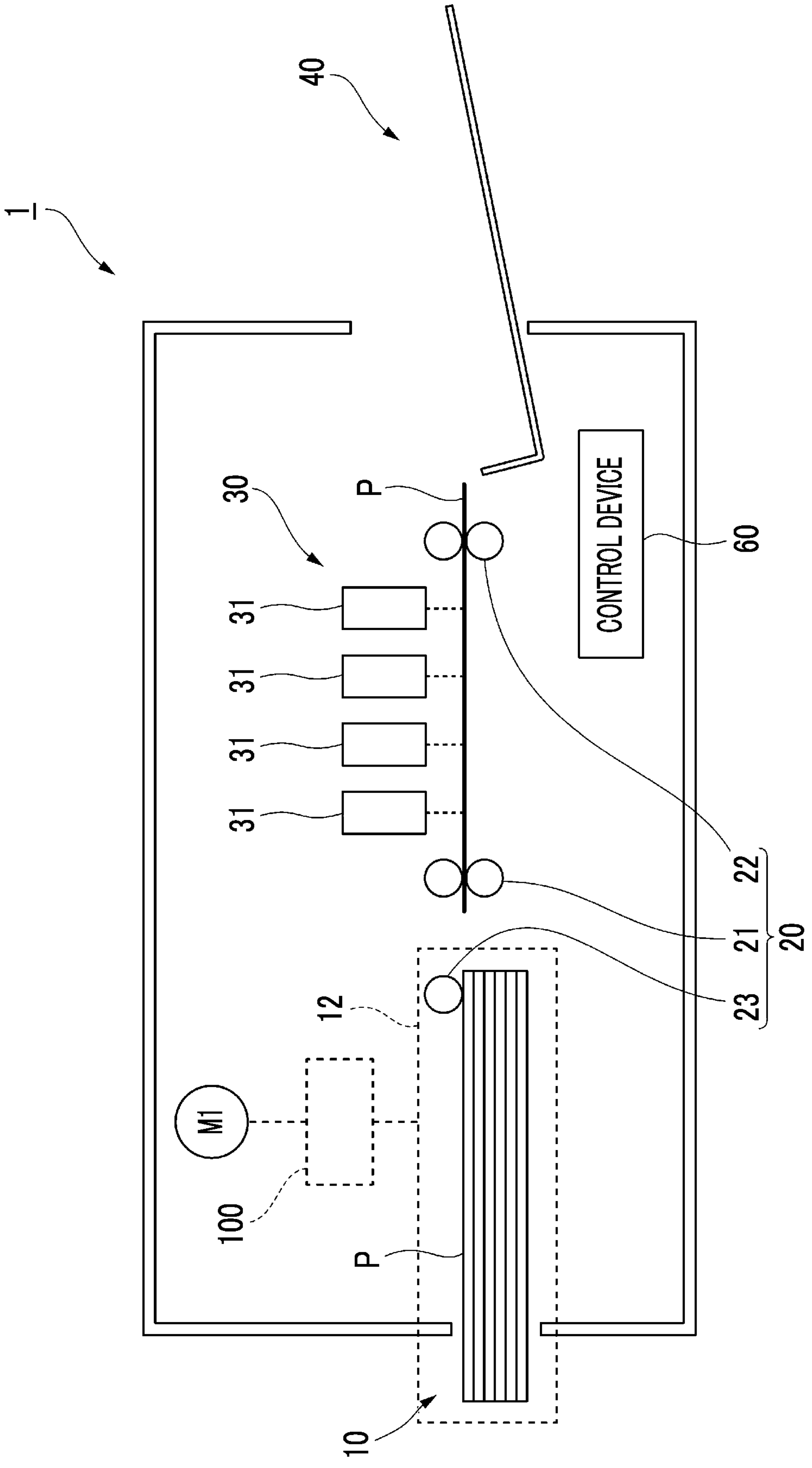
FIG. 1 is a diagram showing an image forming apparatus.

FIG. 1 is a diagram showing an image forming apparatus 1 according to the present exemplary embodiment.

The image forming apparatus 1 according to the present exemplary embodiment is provided with a sheet storage unit 10 that stores sheets P each of which is an example of a recording medium, a transport mechanism 20 that transports the sheet P stored in the sheet storage unit 10, and an image forming unit 30 that forms an image on the sheet P transported by the transport mechanism 20.

The image forming unit 30 is provided with a plurality of ink jet heads 31 that jet ink having colors different from each other. The image forming unit 30 forms an image on the sheet P using the plurality of ink jet heads 31. A method of forming an image by the image forming unit 30 is not limited to an ink jet method and may be other methods.

Further, the image forming apparatus 1 is provided with a sheet loading unit 40 onto which the sheet P on which an image is formed by the image forming unit 30 is loaded, and a control device 60 that controls the respective units of the image forming apparatus 1.

The transport mechanism 20 is provided with a feeding roller 23 that feeds the sheet P stored in the sheet storage unit 10, first transport rollers 21 that transport the sheet P fed by the feeding roller 23 to the image forming unit 30, and second transport rollers 22 that transport the sheet P on which an image is formed by the image forming unit 30 to the sheet loading unit 40.

In addition, a storage unit-moving mechanism 12 moving the sheet storage unit 10 is provided in the present exemplary embodiment. The storage unit-moving mechanism 12 moves the sheet storage unit 10 in a direction perpendicular to the plane of FIG. 1. In other words, the storage unit-moving mechanism 12 moves the sheet storage unit 10 in a direction perpendicular to the transport direction of the sheet P.

Further, in the present exemplary embodiment, a drive motor M1 as an example of a drive source, which generates a driving force used to drive the feeding roller 23, the first transport rollers 21, and the second transport rollers 22 provided in the transport mechanism 20, is provided and the driving force is supplied to these rollers from the drive motor M1.

Furthermore, a driving force transmission device 100, which transmits the driving force generated from the drive motor M1 to the storage unit-moving mechanism 12 serving as an example of an object to be driven, is provided in the present exemplary embodiment.

The driving force transmission device 100 is adapted to be in two states including a state where a driving force can be supplied to the storage unit-moving mechanism 12 and a state where a driving force is not supplied to the storage unit-moving mechanism 12.

In a case where the driving force transmission device 100 is in the state where a driving force can be supplied to the storage unit-moving mechanism 12 in the present exemplary embodiment, a driving force generated from the drive motor M1 is transmitted to the storage unit-moving mechanism 12 and the sheet storage unit 10 is moved.

Further, in a case where the driving force transmission device 100 is in the state where a driving force is not supplied to the storage unit-moving mechanism 12, a driving force generated from the drive motor M1 is not transmitted to the storage unit-moving mechanism 12 and the sheet storage unit 10 is not moved.

A case where a destination to which a driving force output from the driving force transmission device 100 is to be supplied is the storage unit-moving mechanism 12 has been described in the present exemplary embodiment by way of example, but a destination to which a driving force is to be supplied is not limited thereto and may be other parts.

A destination to which a driving force is to be supplied may be a part of a transport system for a sheet P that is different from the sheet storage unit 10. Further, a destination to which a driving force is to be supplied may be a part other than the transport system for a sheet P. Specifically, a destination to which a driving force is to be supplied may be the image forming unit 30.

Furthermore, in the image forming apparatus 1 including a fixing unit that fixes the image formed on the sheet P, a driving force output from the driving force transmission device 100 may be supplied to this fixing unit.

Figure 2:
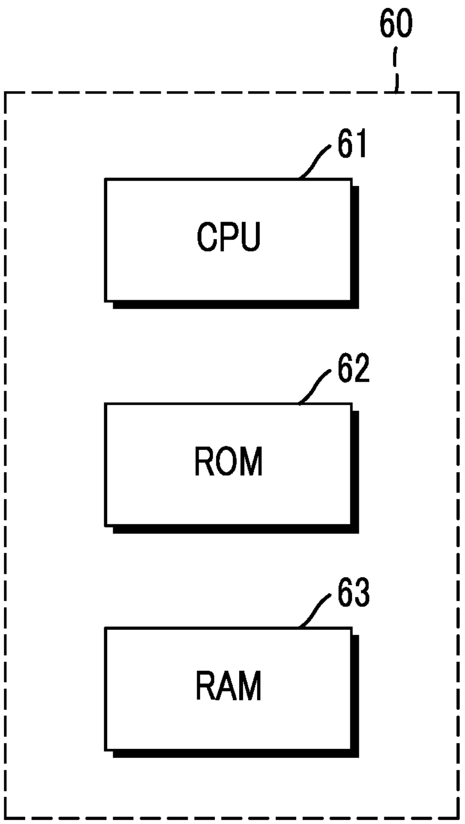
FIG. 2 is a diagram illustrating an example of the configuration of the hardware of a control device.

FIG. 2 is a diagram illustrating an example of the configuration of the hardware of the control device 60.

The control device 60 includes a central processing unit (CPU) 61 as an example of a processor, a read only memory (ROM) 62 in which a control software and the like are stored, and a random access memory (RAM) 63 that is used as a work area.

The CPU 61 may include multiple cores. Further, the ROM 63 may be a rewritable non-volatile semiconductor memory. The control device 60 is a so-called computer.

Here, a program to be executed by the CPU 61 can be provided to the control device 60 in a state where the program is stored in a computer-readable recording medium, such as a magnetic recording medium (a magnetic tape, a magnetic disc, or the like), an optical recording medium (an optical disc, or the like), a magneto-optical recording medium, or a semiconductor memory.

Further, the program to be executed by the CPU 61 may be provided to the control device 60 using communication means, such as the Internet.

Figure 3:
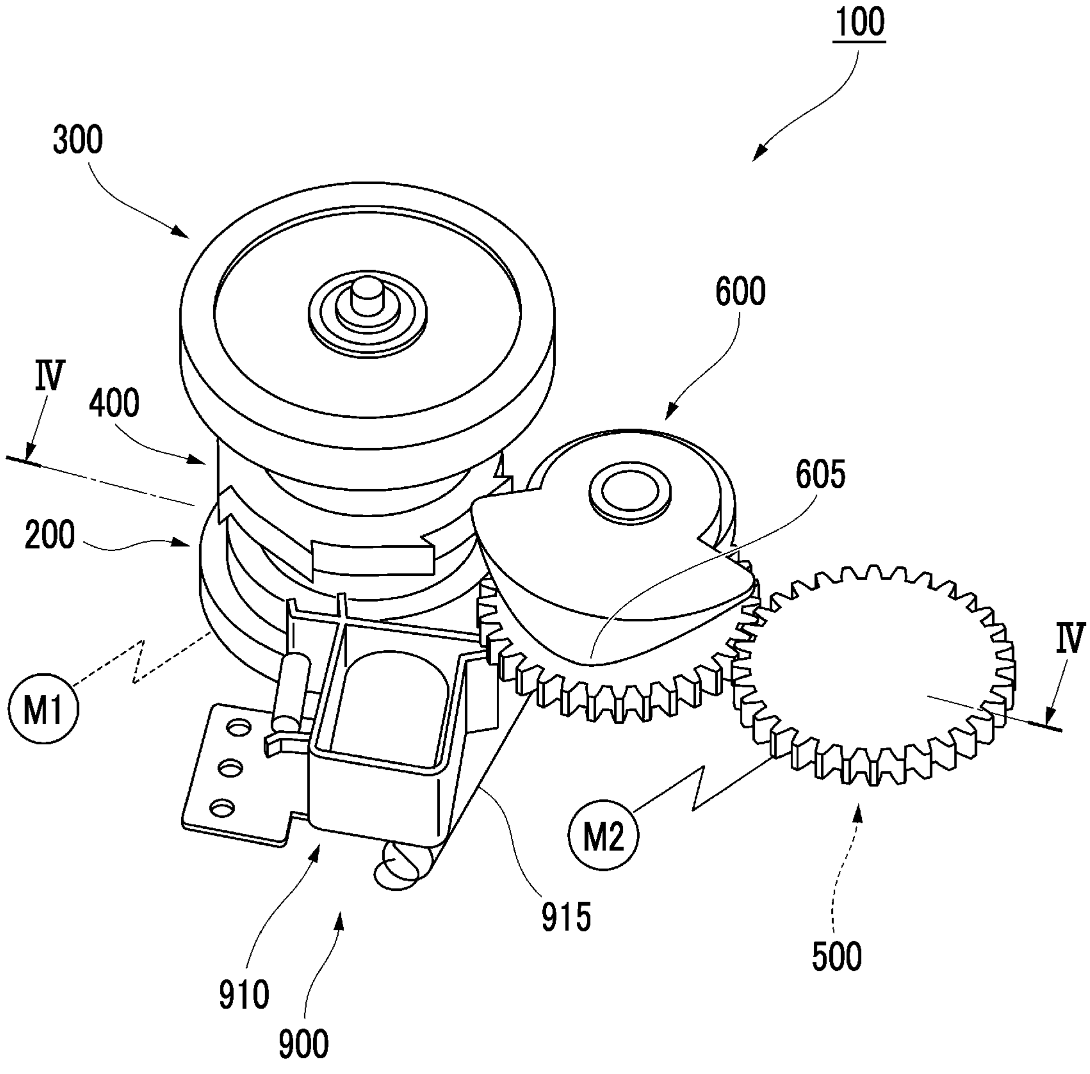
FIG. 3 is a diagram illustrating a driving force transmission device.

FIG. 3 is a diagram illustrating the driving force transmission device 100.

The driving force transmission device 100 shown in FIG. 3 is provided with an input gear 200 to which a driving force is input. Further, the driving force transmission device 100 is provided with an output gear 300 that outputs a driving force. Both the input gear 200 and the output gear 300 are formed in the shape of a disc.

In the present exemplary embodiment, the driving force generated from the drive motor M1 that is an example of the drive source is input to the input gear 200 and the driving force generated from the drive motor M1 is output from the output gear 300 that is an example of the other rotating part. The driving force output from the output gear 300 is supplied to the storage unit-moving mechanism 12.

Further, the driving force transmission device 100 is provided with a control unit 400 that controls the rotation of the output gear 300.

The control unit 400 controls the rotation of the output gear 300 by being switched between a state where the control unit 400 is connected to the output gear 300 and a state where the control unit 400 is separated from the output gear 300 as the states of the control unit 400 with respect to the output gear 300.

Furthermore, the driving force transmission device 100 is provided with a disc-shaped rotating gear 500. The rotating gear 500 is an example of a rotating body that is rotated by receiving a driving force generated from a second motor M2 serving as another example of the drive source.

In addition, the driving force transmission device 100 is provided with an operation unit 600 that is operated by receiving a force output from the rotating gear 500.

The operation unit 600 includes a contact mechanism 605 that is to be in contact with the control unit 400. In the present exemplary embodiment, the contact mechanism 605 is moved along a predetermined circumferential path by a driving force output from the rotating gear 500 and is in contact with the control unit 400.

In the present exemplary embodiment, the control unit 400 is operated in a case where the contact mechanism 605 is in contact with the control unit 400. Further, in the present exemplary embodiment, the contact mechanism 605 is further moved in a state where the contact mechanism 605 is in contact with the control unit 400 after the contact mechanism 605 is in contact with the control unit 400. Then, the contact mechanism 605 is separated from the control unit 400.

Furthermore, an operation mechanism 900 that operates the operation unit 600 and stops the operation of the operation unit 600 is provided in the present exemplary embodiment. The operation mechanism 900 is provided with a solenoid 910 and a tension spring 915.

Figure 4:
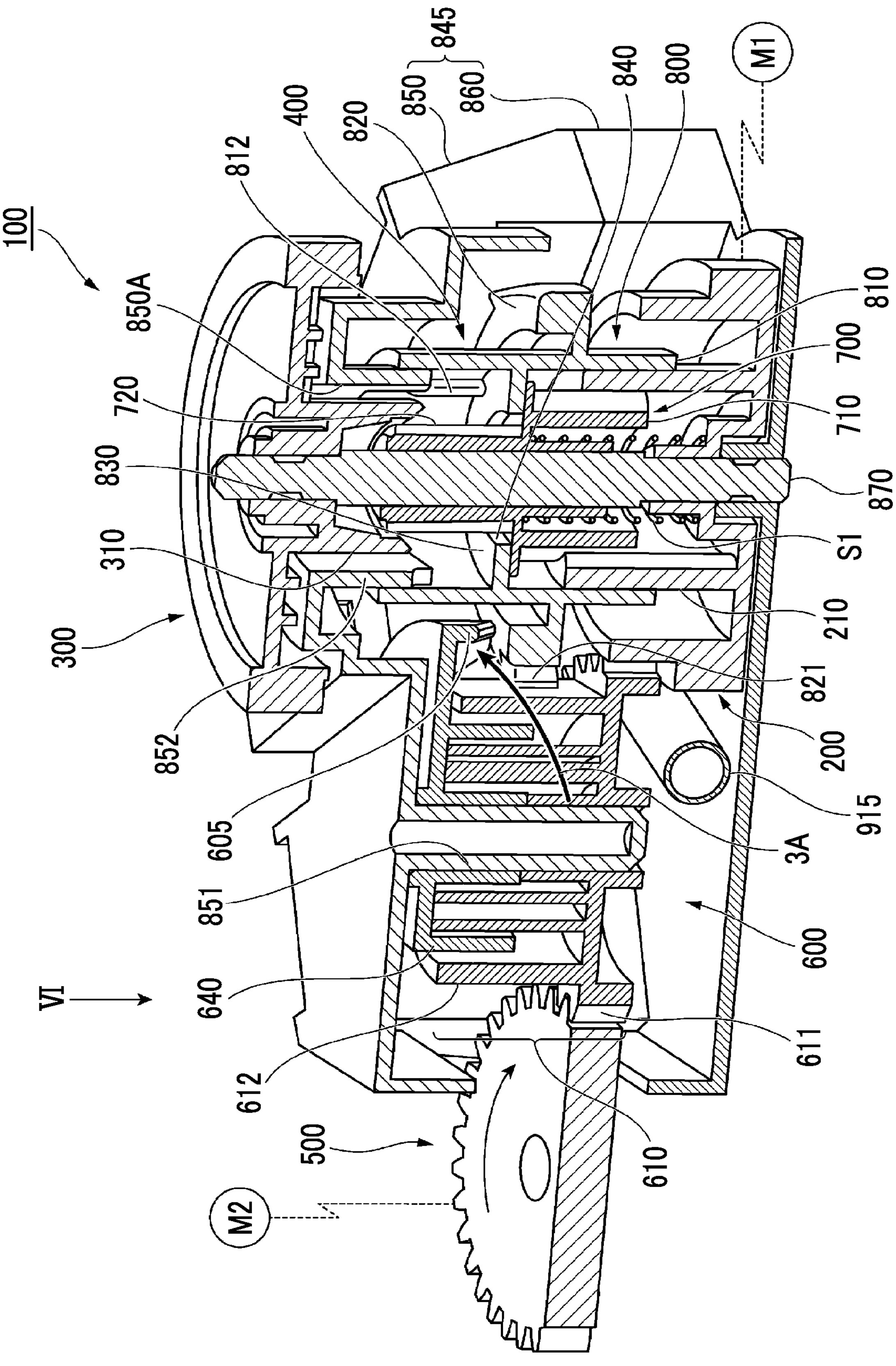
FIG. 4 is a cross-sectional view of the driving force transmission device taken along line IV-IV of FIG. 3.

FIG. 4 is a cross-sectional view of the driving force transmission device 100 taken along line IV-IV of FIG. 3. A housing member 845 not shown in FIG. 3 is also shown in FIG. 4.

The rotating gear 500, which is an example of a rotating body to be rotated by receiving a driving force generated from the second motor M2, is provided as described above in the present exemplary embodiment. In addition, the operation unit 600 that is operated by receiving a force output from the rotating gear 500 is provided.

The operation unit 600 includes the contact mechanism 605 that is to be in contact with the control unit 400 as described above.

In the present exemplary embodiment, the contact mechanism 605 is moved in a direction shown by an arrow 3A of FIG. 4 by a force output from the rotating gear 500 and the contact mechanism 605 is in contact with the control unit 400 as shown in FIG. 4.

Accordingly, the control unit 400 is operated and the control unit 400 is moved down in FIG. 4.

Further, in the present exemplary embodiment, the contact mechanism 605 is separated from the control unit 400 after the contact mechanism 605 is moved by a predetermined distance in a state where the contact mechanism 605 is in contact with the control unit 400.

More specifically, in a case where the contact mechanism 605 shown in FIG. 4 is moved to the back side from a position shown in FIG. 4, the contact mechanism 605 is separated from the control unit 400.

The operation unit 600 includes a columnar member 610 that is formed in a columnar shape, and a mounting member 640 that is mounted on an upper portion of the columnar member 610.

The columnar member 610 is provided with a gear portion 611 that receives a force output from the rotating gear 500, and a columnar portion 612 that is disposed above the gear portion 611 in FIG. 4.

In the present exemplary embodiment, the mounting member 640 is mounted on an end portion of the columnar portion 612.

Further, in the present exemplary embodiment, a portion of the mounting member 640 protrudes downward in FIG. 4 and this protruding portion forms the contact mechanism 605 that is to be in contact with the control unit 400.

In other words, in the present exemplary embodiment, the protruding portion protruding downward in FIG. 4 forms the contact mechanism 605 and the protruding portion is in contact with the control unit 400.

Furthermore, the output gear 300 as an example of the other rotating part is provided as described above in the present exemplary embodiment.

Further, the control unit 400 controlling the rotation of the output gear 300 is provided.

The control unit 400 controls the rotation of the output gear 300 by being switched between a state where the control unit 400 is connected to the output gear 300 and a state where the control unit 400 is separated from the output gear 300 as the states of the control unit 400 with respect to the output gear 300.

Furthermore, in the present exemplary embodiment, the input gear 200, which is rotated by receiving a force generated from the drive motor M1, is provided below the control unit 400.

The input gear 200 includes an input-side tubular portion 210 that is provided at the central portion thereof in a radial direction, extends in an axial direction, and extends toward the output gear 300.

Further, in the present exemplary embodiment, the output gear 300 also includes an output-side tubular portion 310 that is provided at the central portion thereof in a radial direction, extends in an axial direction, and extends toward the input gear 200.

The control unit 400 is provided with a cylindrical rotating member 700 that is rotated while being interlocked with the input gear 200.

The rotating member 700 includes a large-diameter portion 710 and a small-diameter portion 720 having outer diameters different from each other. The large-diameter portion 710 is positioned close to the input gear 200, and the small-diameter portion 720 is positioned close to the output gear 300.

In the present exemplary embodiment, a concave portion and a convex portion, which extend in the axial direction of the rotating member 700, are provided on the outer peripheral surface of the large-diameter portion 710 of the rotating member 700 and the inner peripheral surface of the input-side tubular portion 210 of the input gear 200, respectively.

Since the rotation of the rotating member 700 with respect to the input gear 200 is restricted by the concave portion and the convex portion in the present exemplary embodiment, the rotating member 700 is rotated while being interlocked with the input gear 200.

Further, in the present exemplary embodiment, the rotating member 700 is provided to be movable in a vertical direction in FIG. 4 and is adapted to be capable of advancing and retreating to and from the input gear 200 and the output gear 300.

Furthermore, a concave portion and a convex portion, which extend in the axial direction of the rotating member 700, are provided on the outer peripheral surface of the small-diameter portion 720 of the rotating member 700 and on the inner peripheral surface of the output-side tubular portion 310 of the output gear 300.

Since the rotation of the output gear 300 with respect to the rotating member 700 is restricted by the concave portion and the convex portion in the present exemplary embodiment, the output gear 300 is rotated while being interlocked with the rotating member 700 in a case where the rotating member 700 is connected to the output gear 300.

In addition, the control unit 400 is provided with a biasing coil spring S1 that biases the rotating member 700 toward the output gear 300. The biasing coil spring S1 is disposed between the rotating member 700 and the input gear 200, and biases the rotating member 700 toward the output gear 300.

Moreover, the control unit 400 is provided with a slide member 800 that slides in the vertical direction in FIG. 4.

The slide member 800 is provided to be movable in the vertical direction in FIG. 4 and is adapted to be capable of advancing and retreating to and from the input gear 200 and the output gear 300.

The slide member 800 is provided with a base body 810 that is formed in a cylindrical shape and an annular outer protruding portion 820 that protrudes from the outer peripheral surface of the base body 810 and extends in the circumferential direction of the base body 810.

Further, the slide member 800 is provided with an annular inner protruding portion 830 that protrudes from the inner peripheral surface of the base body 810 toward the inside of the base body 810 and extends in the circumferential direction of the base body 810.

Furthermore, a protrusion 812 extending in the axial direction of the base body 810 is provided on the inner peripheral surface of the base body 810.

The inner protruding portion 830 is positioned closer to the small-diameter portion 720 of the rotating member 700 than the large-diameter portion 710 of the rotating member 700. Further, a through-hole 840 is provided in a region surrounded by the inner protruding portion 830 in the present exemplary embodiment, and the rotating member 700 passes through the through-hole 840 in the present exemplary embodiment.

Furthermore, an outer peripheral portion of the outer protruding portion 820 is provided with protruding portions 821 that protrude from this outer peripheral portion.

In the present exemplary embodiment, the outer protruding portion 820 of the slide member 800 is pushed down by the contact mechanism 605, so that the inner protruding portion 830 of the slide member 800 presses the upper end portion of the large-diameter portion 710 of the rotating member 700 in FIG. 4.

Figure 5:
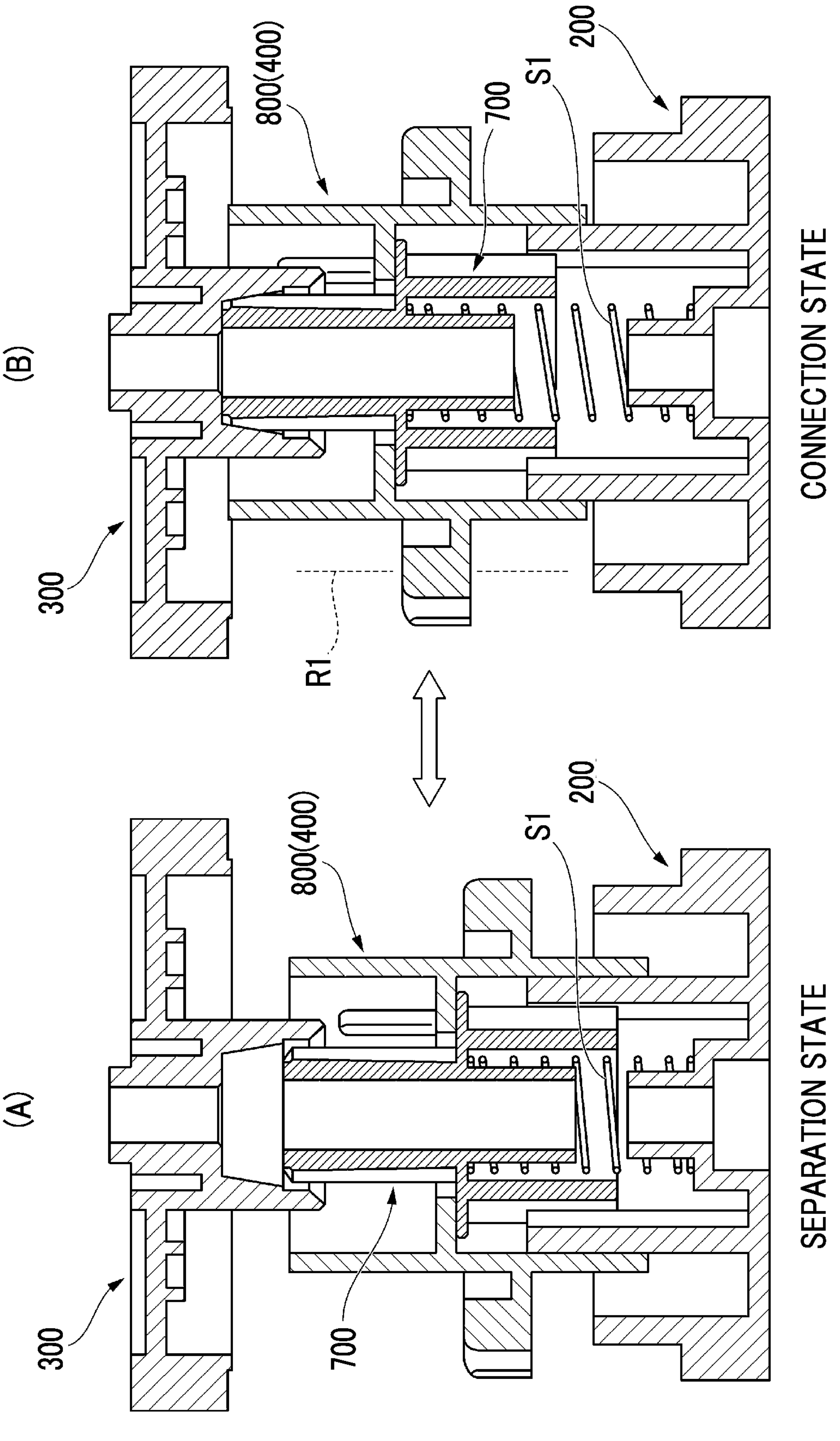

Accordingly, as shown in a part (A) in FIG. 5 (a diagram illustrating the movement of the slide member 800 and the like), the rotating member 700 is moved in a direction away from the output gear 300 and a state where the output gear 300 and the rotating member 700 are separated from each other is made.

Therefore, a rotational driving force is not transmitted to the output gear 300.

Further, in a case where the contact mechanism 605 (see FIG. 4) is separated from the outer protruding portion 820 of the slide member 800 in the present exemplary embodiment, the rotating member 700 is moved toward the output gear 300 by the biasing coil spring S1 as shown in a part (B) in FIG. 5.

In other words, in a case where the contact mechanism 605 (see FIG. 4) is moved to a position away from a movement path R1 of the slide member 800 (see the part (B) in FIG. 5), the rotating member 700 is moved toward the output gear 300. Accordingly, a state where the output gear 300 and the rotating member 700 are connected to each other is made as shown in the part (B) in FIG. 5.

In this connection state, a driving force output from the input gear 200 is transmitted to the output gear 300 through the rotating member 700. Accordingly, in a case where the input gear 200 is rotated, the output gear 300 is rotated with the rotation of the input gear 200.

As shown in FIG. 4, the output gear 300, the rotating member 700, the slide member 800, and the input gear 200 are arranged coaxially. Further, in the present exemplary embodiment, a shaft 870 is provided and passes through the output gear 300, the rotating member 700, the slide member 800, and the input gear 200.

Furthermore, the output gear 300 is mounted on one end portion of the shaft 870 in the present exemplary embodiment. Moreover, the rotating member 700, which is moved in the axial direction, is guided by the shaft 870 in the present exemplary embodiment.

In addition, a housing member 845 is provided in the present exemplary embodiment, and the respective members except for the output gear 300 are housed in the housing member 845. An upper housing member 850 positioned on the upper side in FIG. 4 and a lower housing member 860 positioned on the lower side in FIG. 4 are combined with each other, so that the housing member 845 is formed.

Further, a rod-like protruding portion 851, which protrudes from the inner wall surface of the upper housing member 850 toward the lower housing member 860, is provided in the present exemplary embodiment. The columnar member 610 is rotatably supported by the rod-like protruding portion 851.

Furthermore, a through-hole 850A is formed in the upper housing member 850. In addition, the upper housing member 850 is provided with an upper tubular portion 852 that is connected to the periphery of the through-hole 850A, is formed in a tubular shape, and protrudes downward.

In the present exemplary embodiment, the shaft 870 passes through the through-hole 850A and the inside of the upper tubular portion 852.

Figure 6:
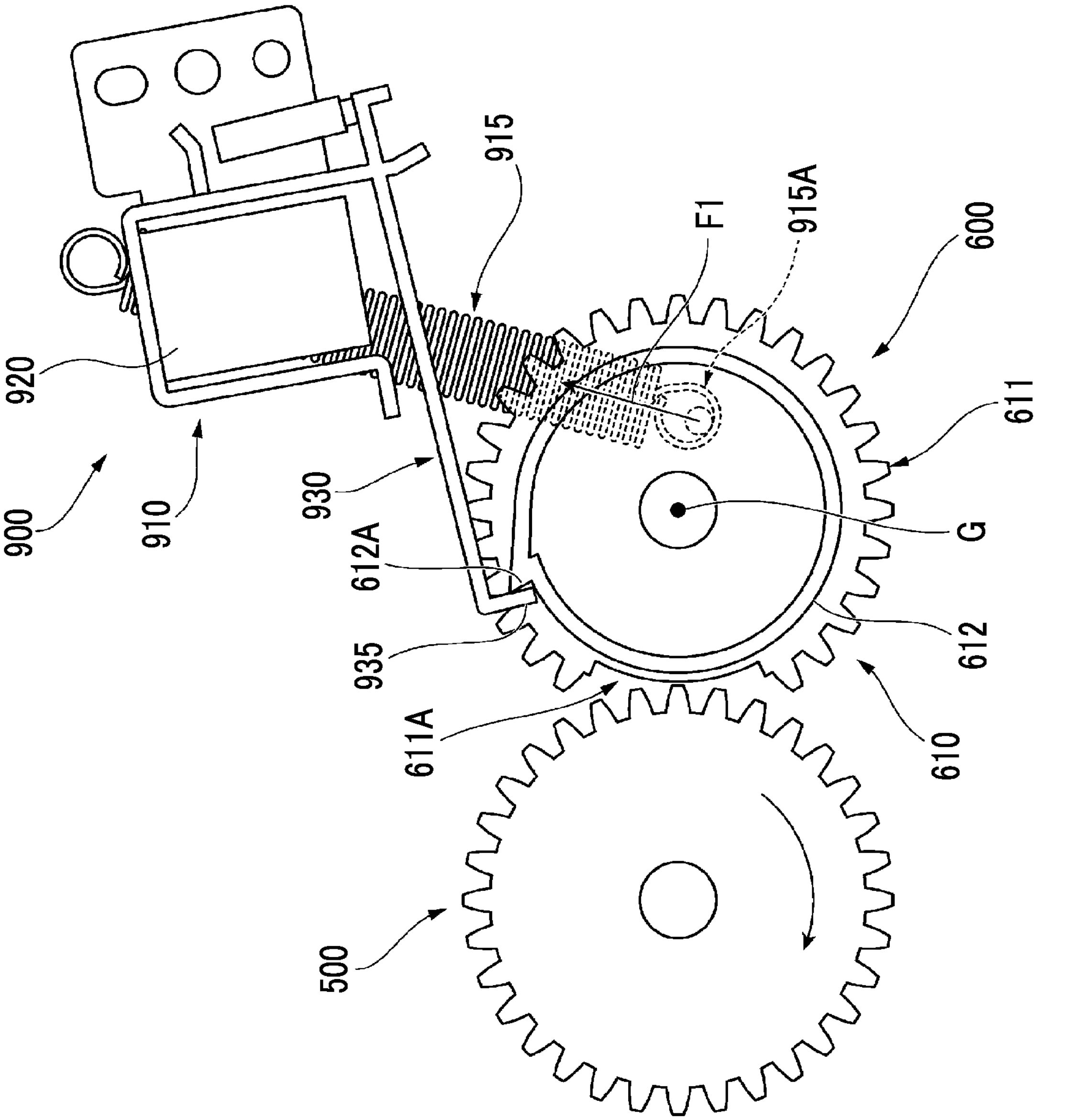
FIG. 6 is a diagram in a case where a rotating gear, a columnar member of an operation unit, and an operation mechanism are viewed in a direction indicated by an arrow VI of FIG. 4.

FIG. 6 is a diagram in a case where the rotating gear 500, the columnar member 610 of the operation unit 600, and the operation mechanism 900 are viewed in a direction indicated by an arrow VI of FIG. 4.

The columnar member 610 of the operation unit 600 is provided with the gear portion 611. The gear portion 611 is provided at one end portion of the columnar member 610 on the outer peripheral surface of the columnar member 610.

A toothless portion 611A that is a portion not provided with teeth is present at a part of the gear portion 611.

In addition, the operation mechanism 900, which is a mechanism for operating the operation unit 600 and stopping the operation of the operation unit 600, is provided in the present exemplary embodiment. The operation mechanism 900 is provided with a solenoid 910 and a tension spring 915.

The solenoid 910 is provided with an electromagnet 920 and a moving member 930 that is attracted and moved by the electromagnet 920. In a case where current is not supplied to the electromagnet 920, the moving member 930 is biased to the columnar member 610.

Further, in the present exemplary embodiment, an end of the moving member 930 is subjected to bending and a bent portion 935, which faces a direction crossing the extending direction of the moving member 930 and faces the columnar member 610, is provided at this end.

One end portion of the tension spring 915 as an example of an elastic member is fixed to a body (not shown) of the driving force transmission device 100. Further, the other end portion 915A of the tension spring 915 is fixed to the columnar member 610 in the present exemplary embodiment.

More specifically, the other end portion 915A of the tension spring 915 is fixed to a portion of the columnar member 610 away from an axis G.

In the present exemplary embodiment, a force for rotating the columnar member 610 in a counterclockwise direction in FIG. 6 is applied to the columnar member 610 by the tension spring 915.

In addition, a protruding portion 612A, which protrudes from the outer peripheral surface of the columnar portion 612, is provided on the outer peripheral surface of the columnar portion 612 of the columnar member 610.

In the present exemplary embodiment, the bent portion 935 is positioned on the movement path of the protruding portion 612A in a state where current is not supplied to the electromagnet 920 and the solenoid 910 is not turned on. Accordingly, the rotation of the columnar member 610 is restricted.

Further, since the rotating gear 500 faces the toothless portion 611A in the state shown in FIG. 6, a driving force is not input to the columnar member 610 from the rotating gear 500.

In a case where current is supplied to the electromagnet 920 in the state shown in FIG. 6 in response to an instruction given from the control device 60 (see FIG. 1) and the solenoid 910 is turned on, the moving member 930 is moved toward the electromagnet 920. Accordingly, the moving member 930 is moved in a direction away from the outer peripheral surface of the columnar portion 612.

Therefore, the restriction of the rotation of the columnar member 610, which has been performed by the operation mechanism 900, is released.

In other words, in a case where the solenoid 910 is turned on, the bent portion 935 is moved to a position away from the movement path of the protruding portion 612A and the restriction of the rotation of the columnar member 610, which has been performed by the bent portion 935, is released.

Accordingly, the columnar member 610, which receives a force applied from the tension spring 915, starts to be rotated in the present exemplary embodiment.

Figure 7:
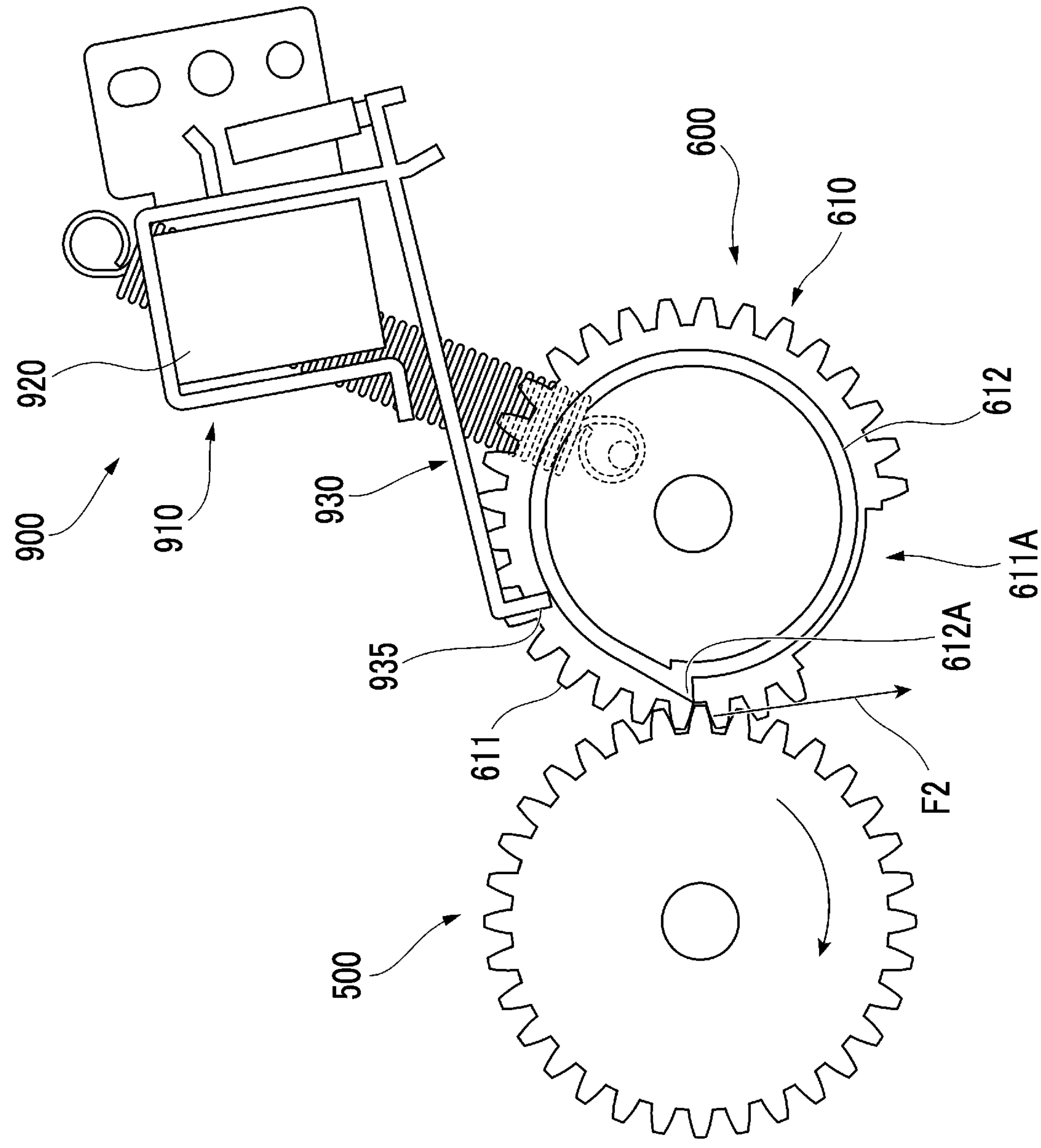

Then, in a case where the columnar member 610 is rotated beyond a predetermined angle, the rotating gear 500 and the gear portion 611 of the columnar member 610 start to mesh with each other as shown in FIG. 7 (a diagram showing other states of the operation unit 600 and the like). Accordingly, a driving force is input to the columnar member 610 even from the rotating gear 500.

In a case where the columnar member 610 starts to be rotated in the present exemplary embodiment, the solenoid 910 is turned off and the bent portion 935 is moved toward the outer peripheral surface of the columnar portion 612.

Accordingly, the bent portion 935 is positioned on the movement path of the protruding portion 612A again, and the rotation of the columnar member 610 is stopped in a case where the columnar member 610 is rotated once.

Further, in a case where the rotation of the columnar member 610 is stopped, the toothless portion 611A of the gear portion 611 faces the rotating gear 500 and the input of a driving force to the columnar member 610 from the rotating gear 500 is also stopped.

Figure 8:
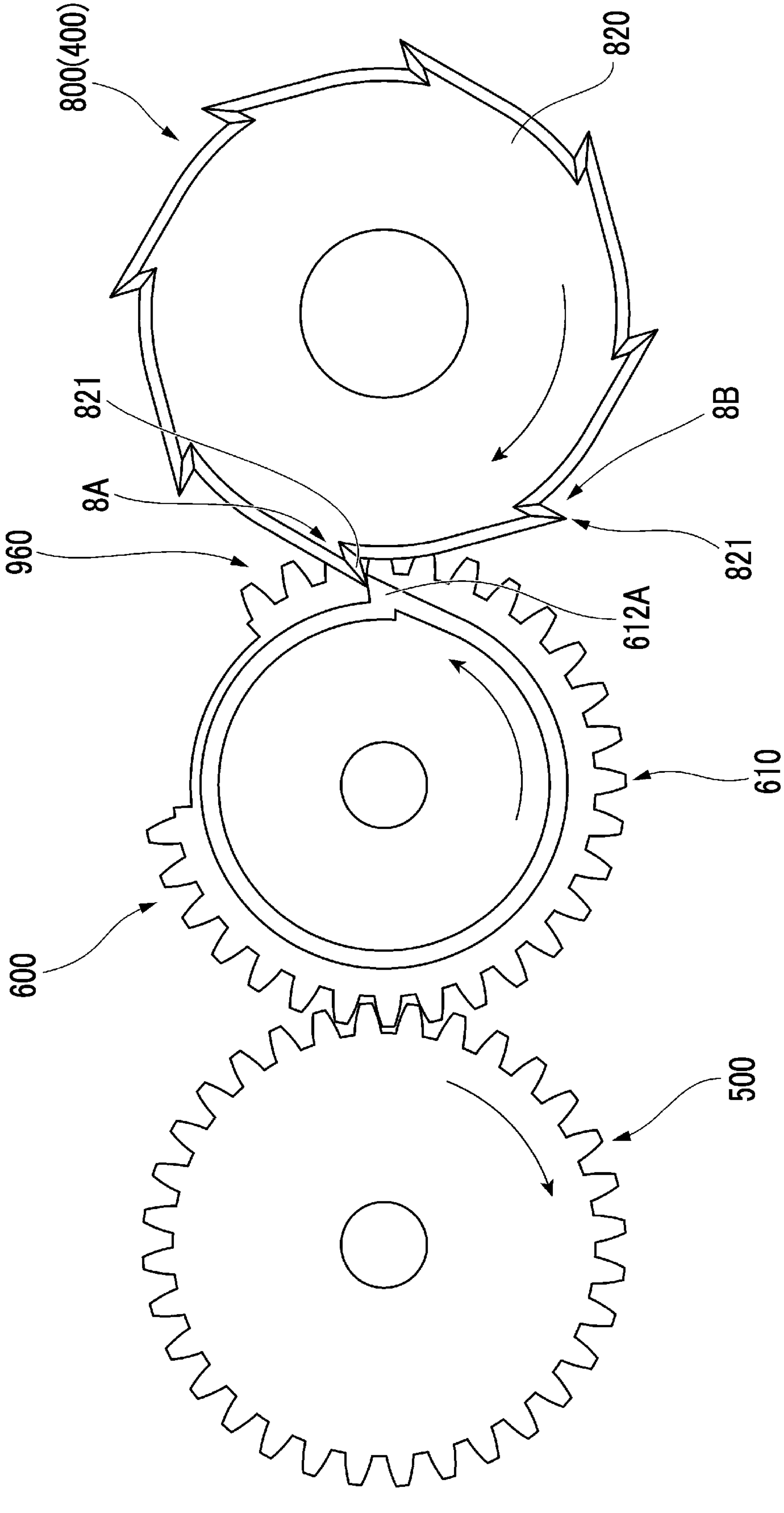
FIG. 8 is a diagram showing the states of the rotating gear, the columnar member, and the control unit in a state where a contact mechanism is in contact with a control unit.

FIG. 8 is a diagram showing the states of the rotating gear 500, the columnar member 610, and the control unit 400 in a state where the contact mechanism 605 is in contact with the control unit 400. In other words, FIG. 8 is a diagram showing the states of the rotating gear 500, the columnar member 610, and the control unit 400 in a state where the contact mechanism 605 is in contact with the control unit 400 as shown in FIG. 4.

The control unit 400 not shown in FIGS. 6 and 7 is also shown in FIG. 8.

In a state where the contact mechanism 605 (see FIG. 4) is in contact with the control unit 400, the rotating gear 500 and the columnar member 610 are in contact with each other as shown in FIG. 8 and the columnar member 610 is rotated by receiving a force output from the rotating gear 500.

In other words, in a state where the contact mechanism 605 is in contact with the control unit 400, the operation unit 600 is operated by receiving a force output from the rotating gear 500.

In the present exemplary embodiment, in a case where the columnar member 610 starts to be rotated from a state where the rotating gear 500 and the columnar member 610 are not in contact with each other (see FIG. 6), the columnar member 610 is rotated by only a force applied from the tension spring 915 (see FIG. 6) without being rotated by the rotating gear 500.

In the present exemplary embodiment, the contact mechanism 605 is not in contact with the control unit 400 in this case. In other words, in a case where the columnar member 610 is rotated by only a force applied from the tension spring 915, the contact mechanism 605 is not in contact with the control unit 400.

In the present exemplary embodiment, in a case where the operation unit 600 is operated by receiving only a force applied from the tension spring 915, which is an example of an elastic member, without receiving a force output from the rotating gear 500, the contact mechanism 605 is not in contact with the control unit 400.

Configuration in which the contact mechanism 605 is in contact with the control unit 400 in a case where the operation unit 600 is operated by receiving only a force applied from the tension spring 915 is assumed here.

In this case, since a driving force acting on the operation unit 600 is small, there is a concern that a trouble, in which the contact mechanism 605 is stopped or the contact mechanism 605 moving while being in contact with the control unit 400 is stopped on the way, or the like may occur in a case where the contact mechanism 605 is in contact with the control unit 400.

In contrast, such a trouble is less likely to occur in configuration where the contact mechanism 605 is in contact with the control unit 400 in a case where the operation unit 600 is operated by receiving a force output from the rotating gear 500 as in the present exemplary embodiment.

In the present exemplary embodiment, a load F2 (see FIG. 7) acting on the columnar member 610 from the rotating gear 500 is larger than a load F1 (see FIG. 6) acting on the columnar member 610 from the tension spring 915.

Further, in the present exemplary embodiment, torque acting on the columnar member 610 in a case where a force output from the rotating gear 500 acts on the columnar member 610 is higher than torque acting on the columnar member 610 in a case where only a force applied from the tension spring 915 acts on the columnar member 610.

The operation unit 600 is operated in at least two operating states including a first operating state where the operation unit 600 is operated by receiving only a force applied from the tension spring 915 without receiving a force output from the rotating gear 500 and a second operating state where the operation unit 600 is operated by receiving a force output from the rotating gear 500.

In the present exemplary embodiment, the contact mechanism 605 and the control unit 400 are in contact with each other after the operating state of the operation unit 600 is switched to the second operating state from the first operating state.

Further, in the present exemplary embodiment, the operating state of the operation unit 600 is switched to the first operating state from the second operating state after the contact mechanism 605 having been in contact with the control unit 400 is separated from the control unit 400.

In the present exemplary embodiment, the operation unit 600 is operated in the second operating state until the contact mechanism 605 is separated from the control unit 400 after being in contact with the control unit 400.

Furthermore, in the present exemplary embodiment, the operation unit 600 continues to be operated in the second operating state until the contact mechanism 605 is separated from the control unit 400 after being in contact with the control unit 400. Accordingly, in the present exemplary embodiment, the contact mechanism 605 is not stopped until the contact mechanism 605 is separated from the control unit 400 after being in contact with the control unit 400.

In the present exemplary embodiment, in a case where the contact mechanism 605 is in contact with the control unit

400 as shown in FIG. 4, the slide member 800 is pressed by the contact mechanism 605 and is moved toward the input gear 200. Accordingly, the rotating member 700 is moved toward the input gear 200 as shown in the part (A) in FIG. 5.

Therefore, the rotating member 700 is separated from the output gear 300, so that a state where the rotating member 700 is separated from the output gear 300 is made as the state of the rotating member 700 with respect to the output gear 300. As a result, the rotation of the output gear 300, which is an example of the other rotating part, is stopped.

The contact mechanism 605 is in contact with the control unit 400 to operate the control unit 400 as described above in the present exemplary embodiment, so that a state where the output gear 300 and the rotating member 700 are separated from each other is made.

Then, in a case where the contact mechanism 605 is further moved backward in FIG. 4 from the state shown in FIG. 4 in the present exemplary embodiment, a state where the contact mechanism 605 and the control unit 400 are not in contact with each other is made.

Here, in the present exemplary embodiment, a state where the output gear 300 and the rotating member 700 are separated from each other is retained even after a state where the contact mechanism 605 and the control unit 400 are not in contact with each other is made.

In the present exemplary embodiment, a retaining mechanism 940 (see FIG. 9) is provided as an example of a retaining unit for retaining a state where the output gear 300 and the rotating member 700 are separated from each other and the state where the output gear 300 and the rotating member 700 are separated from each other is retained by this retaining mechanism 940.

In the present exemplary embodiment, the control unit 400 tends to return to an original state in a case where a state where the contact mechanism 605 (see FIG. 4) and the control unit 400 are not in contact with each other is made.

More specifically, the control unit 400 receives a force applied from the biasing coil spring S1 and tends to be moved toward the output gear 300, and tends to return to the original state where an operation to be performed by the contact mechanism 605 is not yet performed.

The retaining mechanism 940 restricts the movement of the control unit 400 tending to return to the original state so that the state where the output gear 300 and the rotating member 700 are separated from each other is retained.

Specifically, the retaining mechanism 940 causes a restricting portion 859, which restricts the movement of the control unit 400, to be positioned on the movement path of the control unit 400 tending to return to the original state. Accordingly, the movement of the control unit 400 tending to return to the original state is restricted.

More specifically, the retaining mechanism 940 rotates the control unit 400, which tends to return to the original state, as described later to cause the restricting portion 859 to be positioned on the movement path of the control unit 400 tending to return to the original state.

The protruding portion 612A of which the movement is restricted by the bent portion 935 of the moving member 930 as shown in FIG. 6 is provided in the present exemplary embodiment. In the present exemplary embodiment, the protruding portion 612A is used for the rotation of the slide member 800.

The outer protruding portion 820 of the slide member 800 is provided with the protruding portions 821 that protrude outward in the radial direction of the slide member 800 as shown in FIG. 8. The slide member 800 is provided with a total of eight protruding portions 821 provided at intervals of 45°.

In the present exemplary embodiment, in a case where the slide member 800 is pressed by the contact mechanism 605 as shown in FIG. 4 and is moved down, the protruding portion 821, which is denoted by reference numeral 8A, of the slide member 800 shown in FIG. 8 is pressed by the protruding portion 612A of the columnar member 610 that is rotating.

Accordingly, the slide member 800, which forms a part of the control unit 400, is rotated by an angle of 45° in a clockwise direction.

In the present exemplary embodiment, due to the rotation of the slide member 800, the restricting portion 859 (see FIG. 9) is positioned on the movement path of the control unit 400 tending to be moved toward the output gear 300 (described in detail later).

In a case where the slide member 800 is rotated by an angle of 45° from the state shown in FIG. 8 in the present exemplary embodiment, the protruding portion 821, which is denoted by reference numeral 8B of FIG. 8 and is positioned on the upstream side next to the previous protruding portion, is positioned on the movement path of the protruding portion 612A of the columnar member 610. Accordingly, the protruding portion 821 positioned on the upstream side next to the previous protruding portion is pressed in the next pressing that is performed by the protruding portion 612A.

In the present exemplary embodiment, the protruding portion 821 of the slide member 800 is pressed by the protruding portion 612A of the columnar member 610, so that the slide member 800 is rotated by an angle of 45°.

In the present exemplary embodiment, the rotation of the slide member 800 is repeated at intervals of 45°. Further, in the present exemplary embodiment, the slide member 800 is rotated by an angle of 45° whenever the columnar member 610 is rotated once.

Figure 9:
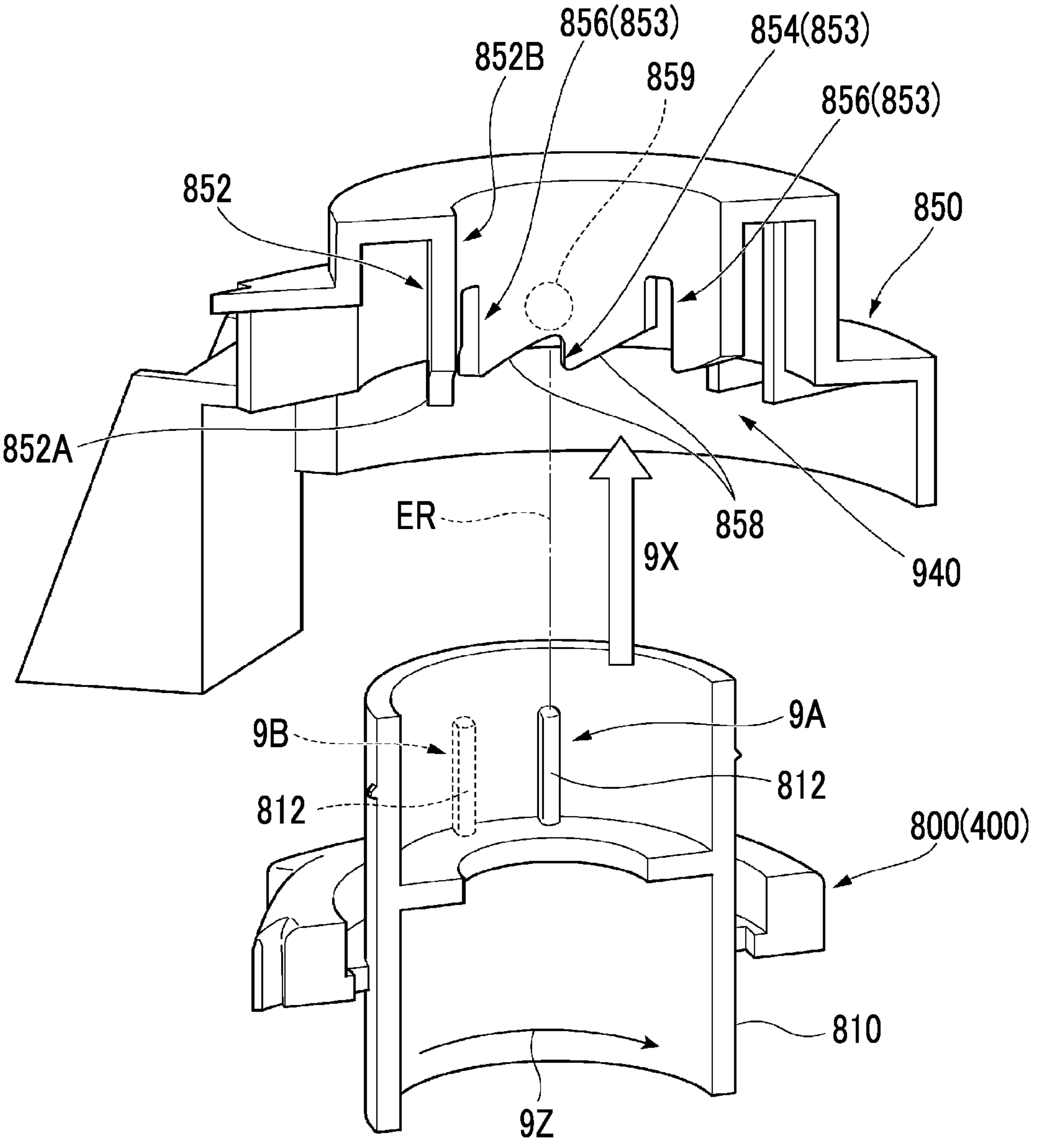
FIG. 9 is a perspective view showing the internal state of an upper tubular portion of an upper housing member and the internal state of a base body of a slide member.

FIG. 9 is a perspective view showing the internal state of the upper tubular portion 852 of the upper housing member 850 and the internal state of the base body 810 of the slide member 800. The restricting portion 859 and the retaining mechanism 940 will be described with reference to FIG. 9.

In the present exemplary embodiment, the protrusion 812 extending in the axial direction of the slide member 800 is provided on the inner peripheral surface of the base body 810 of the slide member 800.

Further, in the present exemplary embodiment, the restricting portion 859 is formed of apart of the upper housing member 850. Specifically, the restricting portion 859 is formed of a part of the upper tubular portion 852 of the upper housing member 850.

In the present exemplary embodiment, the slide member 800 is rotated by an angle of 45° as described above, so that the protrusion 812 is also moved. Accordingly, the restricting portion 859 is positioned on an extended line ER of the protrusion 812 as denoted by reference numeral 9A of FIG. 9.

More specifically, in a case where the slide member 800 is rotated by an angle of 45°, the protrusion 812 having been originally present at a position denoted by reference numeral 9B is moved to a position denoted by reference numeral 9A and the restricting portion 859 is positioned on the movement path of the protrusion 812 forming a part of the control unit 400 that tends to return to the original state.

In other words, the restricting portion 859 is positioned on the movement path of the protrusion 812 forming a part of the control unit 400 that tends to be moved in a direction indicated by an arrow 9X shown in FIG. 9.

Accordingly, even though the control unit 400 tends to return to the original state in the present exemplary embodiment, the protrusion 812 forming a part of the control unit 400 bumps into the restricting portion 859 and the return of the control unit 400 to the original state is restricted. Therefore, a state where the rotating member 700 is separated from the output gear 300 is retained.

A plurality of grooves 853 extending from one end portion 852A of the upper tubular portion 852 toward the other end portion 852B thereof are formed on the upper tubular portion 852.

The grooves 853 are arranged at intervals of 45° in the circumferential direction of the upper tubular portion 852.

Further, two types of grooves, that is, deep grooves 856 having a large depth and shallow grooves 854 having a small depth are provided as the grooves 853 in the present exemplary embodiment. Furthermore, in the present exemplary embodiment, the deep grooves 856 and the shallow grooves 854 are arranged alternately in the circumferential direction of the upper tubular portion 852.

In the present exemplary embodiment, a portion of the upper tubular portion 852, which is positioned closer to the other end portion 852B than the shallow grooves 854, is the restricting portion 859. The restricting portion 859 is not provided at the portions where the deep grooves 856 are formed.

In a case where the protrusion 812 of the slide member 800 is positioned in the deep groove 856, the movement of the protrusion 812 is not restricted, the slide member 800 is moved toward the output gear 300, and the output gear 300 and the rotating member 700 are connected to each other.

On the other hand, in a case where the protrusion 812 of the slide member 800 is positioned in the shallow groove 854, the movement of the protrusion 812 is restricted by the restricting portion 859.

In this case, since the slide member 800 cannot be moved toward the output gear 300, a state where the rotating member 700 is separated from the output gear 300 is retained.

In the present exemplary embodiment, whenever the columnar member 610 is rotated once and the protruding portion 612A (see FIG. 8) of the columnar member 610 presses the protruding portion 821 of the slide member 800, the groove 853 into which the protrusion 812 of the slide member 800 is to be inserted is switched to the other groove 853.

Specifically, the groove 853 into which the protrusion 812 is to be inserted is switched to the deep groove 856 from the shallow groove 854 or to the shallow groove 854 from the deep groove 856.

Accordingly, in the present exemplary embodiment, whenever the columnar member 610 is rotated once, a connection state where the output gear 300 and the rotating member 700 are connected to each other is switched to a separation state where the output gear 300 and the rotating member 700 are separated from each other or the separation state is switched to the connection state.

The retaining mechanism 940 of the present exemplary embodiment causes the restricting portion 859 to be positioned on the movement path of the control unit 400 using a force output from the operation unit 600.

Specifically, in the present exemplary embodiment, as described above, the retaining mechanism 940 rotates the slide member 800 using the protruding portion 612A of the columnar member 610 to cause the restricting portion 859 to be positioned on the movement path of the control unit 400.

The protruding portion 612A is provided on the operation unit 600, and the retaining mechanism 940 causes the restricting portion 859 to be positioned on the movement path of the control unit 400 using a force output from the operation unit 600 in the present exemplary embodiment.

Further, in the present exemplary embodiment, the retaining mechanism 940 causes the restricting portion 859 to be positioned on the movement path of the control unit 400 using a force output from the operation unit 600 that is operated in the second operating state.

Specifically, in a case where the protruding portion 612A of the columnar member 610 shown in FIG. 8 presses the protruding portion 821 of the slide member 800 in the present exemplary embodiment, the rotating gear 500 and the columnar member 610 mesh with each other and the operation unit 600 is operated in the second operating state.

In the present exemplary embodiment, the retaining mechanism 940 causes the restricting portion 859 to be positioned on the movement path of the control unit 400 using a force output from the operation unit 600 that is operated in the second operating state.

Incidentally, in order to retain the state where the rotating member 700 is separated from the output gear 300, for example, the toothless portion 611A may be caused to face the rotating gear 500 in the state shown in FIG. 4 and the contact mechanism 605 may be stopped in the state shown in FIG. 4.

Incidentally, in a case where the stopped contact mechanism 605 is to be moved again in this case, the operation unit 600 starts to be operated by receiving only a force applied from the tension spring 915. For this reason, a trouble, in which the contact mechanism 605 is not moved, or the like is likely to occur.

In contrast, in the configuration of the present exemplary embodiment, the contact mechanism 605 is not stopped in a state where the contact mechanism 605 is in contact with the control unit 400. Accordingly, the occurrence of such a trouble is suppressed.

Further, even though the contact mechanism 605 is adapted to be stopped in a state where the contact mechanism 605 is in contact with the control unit 400, the contact mechanism 605 is operated by receiving a force output from the rotating gear 500 in a case where the stopped contact mechanism 605 is to be moved again in the present exemplary embodiment.

For this reason, in the present exemplary embodiment, a trouble, in which the contact mechanism 605 is not moved, or the like is less likely to occur even in a case where the contact mechanism 605 is stopped in a state where the contact mechanism 605 is in contact with the control unit 400.

Furthermore, a release mechanism 960 (see FIG. 8) as an example of a release unit that releases a retention state where the separation state is retained is provided in the present exemplary embodiment.

The release mechanism 960 of the present exemplary embodiment releases this retention state using the operation unit 600. Specifically, the release mechanism 960 causes the operation unit 600 to be in contact with the control unit 400 to change the state of the control unit 400, and releases the retention state.

In the present exemplary embodiment, the retaining mechanism 940 retains the separation state by restricting the movement of the control unit 400 that tends to return to the original state where the operation of the control unit 400 is not yet performed by the contact mechanism 605 as described above.

The release mechanism 960 releases a retention state where the separation state is retained by releasing this restriction.

Specifically, the release mechanism 960 causes the restricting portion 859 to deviate from the movement path of the control unit 400, which tends to return to the original state, to release the retention state.

More specifically, the release mechanism 960 rotates the slide member 800, which forms a part of the control unit 400, to cause the restricting portion 859 to deviate from the movement path of the protrusion 812 (see FIG. 9).

More specifically, the release mechanism 960 rotates the slide member 800, which forms a part of the control unit 400, to cause the deep groove 856 to be positioned on the extended line ER of the protrusion 812 so that the restricting portion 859 deviates from the movement path of the protrusion 812.

More specifically, in a case where release is performed by the release mechanism 960 in the present exemplary embodiment, the solenoid 910 is turned on to operate the operation unit 600. Accordingly, the state shown in FIG. 4 is made and the slide member 800 is moved down.

In this case, the protruding portion 821 of the slide member 800 is pressed by the protruding portion 612A shown in FIG. 8 and the slide member 800 is rotated.

In a case where the slide member 800 is rotated, the restricting portion 859 is positioned at a position away from the extended line ER of the protrusion 812 (see FIG. 9). More specifically, the deep groove 856 is positioned on the extended line ER of the protrusion 812, and the restricting portion 859 is positioned at a position away from the extended line ER of the protrusion 812.

Further, in a case where the contact mechanism 605 passes by the control unit 400 in the present exemplary embodiment, the slide member 800 of the control unit 400 is moved toward the output gear 300 by receiving a force applied from the biasing coil spring S1 as shown in the part (B) in FIG. 5.

In this case, since the restricting portion 859 is positioned at a position away from the movement path of the protrusion 812, the movement of the control unit 400 is not restricted by the restricting portion 859. In other words, since a state where restriction performed by the restricting portion 859 is released is made, the movement of the control unit 400 is not restricted by the restricting portion 859.

Accordingly, the rotating member 700 is connected to the output gear 300, so that a state where a driving force can be transmitted to the output gear 300 is made.

The release mechanism 960 releases the retention state using a force output from the operation unit 600, like the retaining mechanism 940.

Further, in a case where release is performed by the release mechanism. 960 in the present exemplary embodiment, the rotating gear 500 meshes with the columnar member 610 and the operation unit 600 is operated in the second operating state.

For this reason, in the present exemplary embodiment, the release mechanism 960 releases the retention state using a force output from the operation unit 600 that is operated in the second operating state.

A case where the separation state is retained using the retaining mechanism 940 has been described above by way of example. However, the present invention is not limited thereto, and a state where the output gear 300 and the rotating member 700 are connected to each other may be retained using the retaining mechanism 940.

In other words, a state where the control unit 400 is connected to the output gear 300 may be retained using the retaining mechanism 940 as the state of the control unit 400 with respect to the output gear 300.

An aspect where the control unit 400 is operated to separate the rotating member 700 from the output gear 300 has been described above, but the present invention is not limited thereto. For example, an aspect where the control unit 400 is operated to connect the rotating member 700, which is separated from the output gear 300, to the output gear 300 is also considered.

In this case, this connection state is retained using the retaining mechanism 940.

Further, in the above description, the retaining mechanism 940 has rotated a part of the control unit 400, which tends to return to the original state, to position the restricting portion 859 on the movement path of the control unit 400.

Incidentally, the rotation of the control unit 400 is not indispensable. For example, the control unit 400 may be displaced (moved) in a direction crossing a direction where the control unit 400 tending to return to the original state faces to cause the restricting portion 859 to be positioned on the movement path of the control unit 400.

Furthermore, the rotation or displacement of the control unit 400 has caused the restricting portion 859 to be positioned on the movement path of the control unit 400, which tends to return to the original state, in the above description, but the present invention is not limited thereto. The restricting portion 859 may be moved so as to be positioned on the movement path of the control unit 400.

In a case where the restricting portion 859 is moved, for example, the upper tubular portion 852 (see FIG. 9) of the upper housing member 850 is adapted to be rotated and the upper tubular portion 852 is rotated in the circumferential direction to cause the restricting portion 859 to be positioned on the movement path of the control unit 400.

Even in a case where the restricting portion 859 is moved, the restricting portion 859 may be moved using a force output from the operation unit 600 as described above. Further, in a case where the restricting portion 859 is moved, although there is no particular limitation, it is preferable that the restricting portion 859 is moved using a force output from the operation unit 600 being in the second operating state as described above.

Furthermore, in a case where the retaining mechanism 940 retains a state where the output gear 300 and the rotating member 700 are connected to each other, the release mechanism 960 releases this connection state.

With regard to this release, as described above, for example, the release mechanism 960 rotates or displaces a part of the control unit 400 or moves the restricting portion 859 to cause the restricting portion 859 not to be positioned on the movement path of the control unit 400.

Further, the rotating member 700, which is a member positioned on the input gear 200, has been moved in the above description. However, the control unit 400 may be provided on the output gear 300 and the output gear 300 may be moved to connect the output gear 300 to the input gear 200 and to release the connection between the output gear 300 and the input gear 200.

Furthermore, a guide portion 858, which guides the protrusion 812, is provided between the shallow groove 854 and the deep groove 856 as shown in FIG. 9 in the present exemplary embodiment. In other words, a guide portion 858, which guides the protrusion 812, is provided between the grooves 853 adjacent to each other.

The guide portion 858 is inclined so as to be close to the other end portion 852B of the upper tubular portion 852 as advancing in a direction indicated by an arrow 9Z that is the rotation direction of the slide member 800.

In a case where the rotation angle of the slide member 800, which is rotated by the protruding portion 612A of the columnar member 610 (see FIG. 8), is small in the present exemplary embodiment, the protrusion 812 of the slide member 800 is in contact with the guide portion 858.

Accordingly, the slide member 800 is rotated, so that the shallow groove 854 or the deep groove 856 is positioned on the extended line ER of the protrusion 812.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A driving force transmission device comprising:

a rotating gear that is rotated by receiving a driving force;

a control unit that controls rotation of an output gear by being switched between a connection state where the control unit is connected to the output gear and a separation state where the control unit is separated from the output gear as states of the control unit with respect to the output gear, wherein the control unit comprises a cylindrical rotating member; and an operation unit that is operated by receiving a force output from the rotating gear and includes a contact mechanism to be in contact with the control unit, the contact mechanism being moved by the force output from the rotating gear to operate the control unit and the contact mechanism then being separated from the control unit, wherein the contact mechanism is a protrusion, wherein the operation unit is disposed between the rotating gear and the control unit, wherein the contact mechanism is in contact with the control unit to operate the control unit, so that the connection state or the separation state is made, and the driving force transmission device further comprises a retaining unit that retains the connection state or the separation state even after the contact mechanism is separated from the control unit.

2. The driving force transmission device according to claim 1, wherein until the contact mechanism of the operation unit is separated from the control unit after being in contact with the control unit, the operation unit is operated by receiving the force output from the rotating gear.

3. The driving force transmission device according to claim 1, wherein the retaining unit restricts movement of the control unit, which tends to return to an original state where an operation of the control unit is not yet performed by the contact mechanism, so that the connection state or the separation state is retained.

4. The driving force transmission device according to claim 3, wherein the retaining unit causes a restricting portion, which restricts the movement of the control unit, to be positioned on a movement path of the control unit, which tends to return to the original state, to restrict the movement of the control unit tending to return to the original state.

5. The driving force transmission device according to claim 4, wherein the retaining unit rotates or displaces at least a part of the control unit, which tends to return to the original state, to cause the restricting portion to be positioned on the movement path of the control unit tending to return to the original state.

6. The driving force transmission device according to claim 4, wherein the retaining unit causes the restricting portion to be positioned on the movement path using a force output from the operation unit.

7. The driving force transmission device according to claim 6, wherein the operation unit is operated in at least two operating states including a first operating state where the operation unit is operated by receiving a force applied from an elastic member and a second operating state where the operation unit is operated by receiving the force output from the rotating gear, and the retaining unit causes the restricting portion to be positioned on the movement path using the force output from the operation unit that is operated in the second operating state.

8. The driving force transmission device according to claim 1, further comprising:

a release unit that releases a retention state where the connection state or the separation state is retained.

9. The driving force transmission device according to claim 8, wherein the release unit releases the retention state using the operation unit.

10. The driving force transmission device according to claim 9, wherein the retaining unit causes the operation unit to be in contact with the control unit to change a state of the control unit, and releases the retention state.

11. The driving force transmission device according to claim 8, wherein the retaining unit restricts movement of the control unit, which tends to return to an original state where an operation of the control unit is not yet performed by the contact mechanism, so that the connection state or the separation state is retained, and the release unit releases restriction of the movement to release the retention state where the connection state or the separation state is retained.

12. The driving force transmission device according to claim 11, wherein the retaining unit causes a restricting portion, which restricts the movement of the control unit, to be positioned on a movement path of the control unit, which tends to return to the original state, to restrict the movement of the control unit tending to return to the original state, and the release unit causes the restricting portion to deviate from the movement path of the control unit, which tends to return to the original state, to release the retention state.

13. The driving force transmission device according to claim 12, wherein the release unit rotates or displaces at least a part of the control unit to cause the restricting portion to deviate from the movement path.

14. The driving force transmission device according to claim 8, wherein the release unit releases the retention state using a force output from the operation unit.

15. The driving force transmission device according to claim 14, wherein the operation unit is operated in at least two operating states including a first operating state where the operation unit is operated by receiving a force applied from an elastic member and a second operating state where the operation unit is operated by receiving a force output from the rotating gear, and the release unit releases the retention state using the force output from the operation unit that is operated in the second operating state.

16. The driving force transmission device according to claim 1, wherein until the contact mechanism is separated from the control unit after being in contact with the control unit, the contact mechanism is not stopped.

17. An image forming apparatus that forms an image on a recording medium, the image forming apparatus comprising:

a drive source; and a driving force transmission device that transmits a driving force generated from the drive source to an object to be driven, wherein the driving force transmission device is formed of the driving force transmission device according to claim 1.

18. A driving force transmission device comprising:

a rotating body that is rotated by receiving a driving force;

a control unit that controls rotation of an output gear by being switched between a connection state where the control unit is connected to the output gear and a separation state where the control unit is separated from the output gear as states of the control unit with respect to the output gear, wherein the control unit comprises a cylindrical rotating member; and an operation unit that is operated by receiving a force output from the rotating body and includes a contact mechanism to be in contact with the control unit, the contact mechanism being moved by the force output from the rotating body to operate the control unit and the contact mechanism then being separated from the control unit, wherein the contact mechanism is a protrusion, wherein the operation unit is operated by also receiving a force applied from an elastic member, and in a case where the operation unit is operated by receiving the force applied from the elastic member without receiving the force output from the rotating body, the contact mechanism is not in contact with the control unit.

19. A driving force transmission device comprising:

a rotating gear that is rotated by receiving a driving force;

a control unit that controls rotation of an output gear by being switched between a connection state where the control unit is connected to the output gear and a separation state where the control unit is separated from the output gear as states of the control unit with respect to the output gear, wherein the control unit comprises a cylindrical rotating member; and an operation unit that is operated by receiving a force output from the rotating gear and includes a contact mechanism to be in contact with the control unit, the contact mechanism being moved by the force output from the rotating gear to operate the control unit and the contact mechanism then being separated from the control unit, wherein the contact mechanism is a protrusion, wherein the operation unit is operated in at least two operating states including a first operating state where the operation unit is operated by receiving a force applied from an elastic member without receiving the force output from the rotating gear and a second operating state where the operation unit is operated by receiving the force output from the rotating gear, the contact mechanism and the control unit are in contact with each other after an operating state of the operation unit is switched to the second operating state from the first operating state, and the operating state of the operation unit is switched to the first operating state from the second operating state after the contact mechanism being contact with the control unit is separated from the control unit.

* * * * *